United States Patent
Ibe et al.

(10) Patent No.: US 8,041,360 B2
(45) Date of Patent: Oct. 18, 2011

(54) METHOD OF SEAMLESS ROAMING BETWEEN WIRELESS LOCAL AREA NETWORKS AND CELLULAR CARRIER NETWORKS

(75) Inventors: Oliver C. Ibe, Andover, MA (US); Jianyu Zeng, Reading, MA (US)

(73) Assignee: Kraasten Bros. Fund B.V. LLC, Dover, DE (US)

( * ) Notice: Subject to any disclaimer, the term of this patent is extended or adjusted under 35 U.S.C. 154(b) by 0 days.

(21) Appl. No.: 12/874,183

(22) Filed: Sep. 1, 2010

(65) Prior Publication Data
US 2010/0323665 A1    Dec. 23, 2010

Related U.S. Application Data

(62) Division of application No. 10/688,608, filed on Oct. 17, 2003, now Pat. No. 7,835,751.

(60) Provisional application No. 60/419,674, filed on Oct. 18, 2002.

(51) Int. Cl.
*H04W 40/00* (2009.01)
*H04W 36/00* (2009.01)
*H04M 1/66* (2006.01)

(52) U.S. Cl. ............... 455/448; 455/411; 455/436

(58) Field of Classification Search ............ 455/448, 455/436–445, 432.1, 422.1, 426.1, 55, 552.1, 455/411, 434; 370/328, 331, 338
See application file for complete search history.

(56) References Cited

U.S. PATENT DOCUMENTS

| | | | |
|---|---|---|---|
| 5,175,867 A | 12/1992 | Wejke et al. | |
| 6,075,985 A | 6/2000 | Kao | |
| 6,243,581 B1 * | 6/2001 | Jawanda | 455/432.2 |
| 6,766,165 B2 | 7/2004 | Sharma et al. | |
| 6,766,171 B2 * | 7/2004 | Pan et al. | 455/439 |
| 6,768,726 B2 | 7/2004 | Dorenbosch et al. | |
| 6,904,277 B2 * | 6/2005 | Tsutsumi et al. | 455/411 |
| 6,947,405 B2 * | 9/2005 | Pitcher et al. | 370/338 |
| 6,961,573 B1 | 11/2005 | Moon et al. | |
| 6,999,431 B2 | 2/2006 | Rines | |
| 7,039,027 B2 | 5/2006 | Bridgelall | |
| 7,089,005 B2 | 8/2006 | Reddy | |
| 7,149,521 B2 * | 12/2006 | Sundar et al. | 455/435.1 |
| 7,177,636 B2 | 2/2007 | Oda et al. | |
| 7,203,482 B2 * | 4/2007 | Blumenthal et al. | 455/411 |
| 7,251,488 B2 | 7/2007 | Chitrapu | |
| 7,260,638 B2 | 8/2007 | Crosbie | |
| 7,356,015 B2 * | 4/2008 | Ibe et al. | 370/338 |
| 7,391,748 B2 * | 6/2008 | Feather | 370/328 |
| 7,408,906 B2 | 8/2008 | Griswold et al. | |
| 7,519,363 B2 | 4/2009 | Shin et al. | |
| 7,583,632 B2 | 9/2009 | Janevski et al. | |
| 7,653,200 B2 | 1/2010 | Karmi et al. | |
| 2003/0134650 A1 | 7/2003 | Sundar et al. | |
| 2004/0072593 A1 | 4/2004 | Robbins et al. | |
| 2005/0101245 A1 | 5/2005 | Ahmavaara | |

* cited by examiner

*Primary Examiner* — Brandon Miller
(74) *Attorney, Agent, or Firm* — McDonnell Boehnen Hulbert & Berghoff LLP

(57) ABSTRACT

A scheme that enables seamless roaming between the WLAN and the cellular carrier network by enabling a user that originates a call in the WLAN and happens to go outside the range of the WLAN to automatically switch over to the cellular carrier network without losing connection with the other party. This solution assumes that the mobile device has the capability to operate in at least two modes that include the WLAN mode and one of the cellular carrier modes, such as the GSM, IS-95 CDMA, IS-136 TDMA, and iDEN.

18 Claims, 3 Drawing Sheets

METHOD OF SEAMLESS ROAMING BETWEEN WIRELESS LOCAL AREA NETWORKS AND CELLULAR CARRIER NETWORKS

RELATED APPLICATIONS

This application is a divisional application of U.S. patent application Ser. No. 10/688,608, filed on Oct. 17, 2003, which claims the benefit of provisional application Ser. No. 60/419,674 filed on Oct. 18, 2002, all of which are incorporated by reference herein in its entirety.

BACKGROUND OF THE INVENTION

The proliferation of the wireless local area networks (WLANs) has led to the search for ways in which its utilization can be increased. By WLAN, we include all instantiations of such technologies as 802.11a, 802.11b, 802.11g, Bluetooth and any similar WLAN versions. For example, the specification for the IEEE 802.11 version of WLAN includes an access scheme called the distributed control function, which permits the network to support both data and voice applications. Today voice over wireless local area network (VoWLAN) is a reality. The voice may be encoded and transmitted using voice over internet protocol (VoIP) format and protocols such as G.711, G.726, G.729, SIP, MEGACO, H.323, or other similar protocols that are being developed.

One of the issues in WLAN is that there is a limited range of operation due to power requirements. For example, a typical IEEE 802.11 WLAN has a range of at most 300 yards from the access point that connects the mobile devices to the wired LAN. Thus, when an IEEE 802.11-based mobile device roams beyond this range, any call in progress is forcibly terminated.

SUMMARY OF THE INVENTION

The present invention concerns a scheme that enables seamless roaming between the WLAN and the cellular carrier network. The method enables a user that originates a call in the WLAN and happens to go outside the range of the WLAN to automatically switch over to the cellular carrier network without losing connection with the other party. This solution assumes that the mobile device has the capability to operate in at least two modes that include the WLAN mode and one of the cellular carrier modes, such as the GSM, IS-95 CDMA, IS-136 TDMA, and iDEN.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

A typical WLAN is comprised of access points (APs) that are connected to the enterprise LAN via an access controller (AC) or a wireless LAN switch. The access controller/wireless LAN switch AC is the center of intelligence of the WLAN and is responsible for admission control, authentication and mobile device roaming coordination. One AC/wireless LAN switch can control several APs and multiple ACs/wireless LAN switches can be in the same network. Another device called the Cellular Proxy (CP) is a gateway that connects the enterprise LAN to the cellular network. If the enterprise PBX is not VoIP-capable, the cellular proxy also provides the VoIP interface between the enterprise LAN and the PBX. The Cellular Proxy is located in the part of the enterprise building that has a very good cellular coverage.

The Cellular Proxy is not necessarily tightly coupled to any cellular network. To any cellular network, it is a bank of radios. It hides the details of the movement of the mobile devices within the enterprise premises from the cellular network thereby preventing the cellular network from making frequent updates to its database. Also, it can connect to multiple cellular networks simultaneously because it contains radios for different types of cellular network technologies, such as CDMA, AMPS TDMA, GSM TDMA, iDEN, WCDMA, CDMA2000, GPRS, 1XRTT, 1xEVDO, and 1xEVDV. Thus, the Cellular Proxy can proxy for mobile devices in CDMA-based and TDMA-based cellular networks simultaneously.

Figure 1:
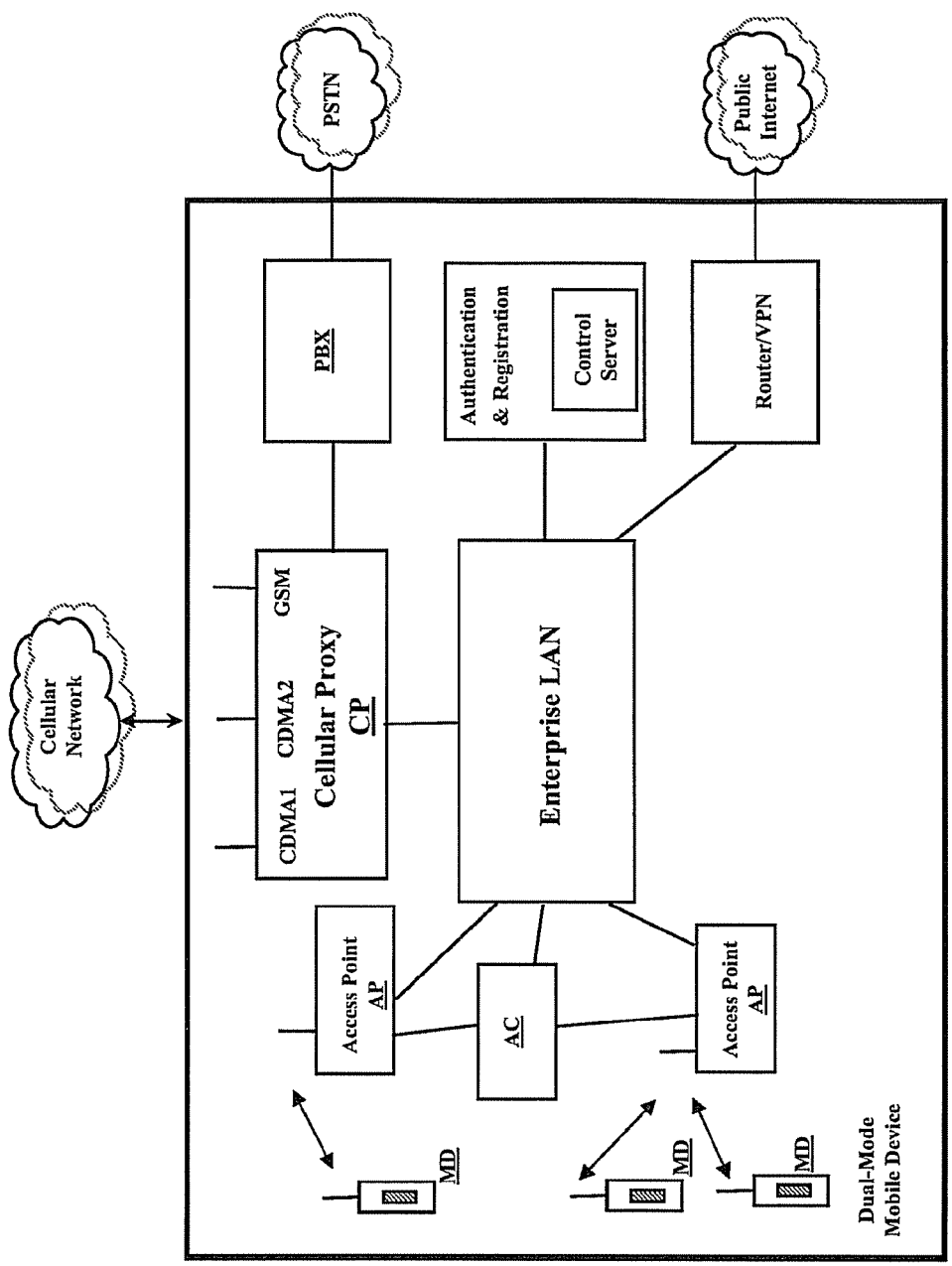
FIG. 1 is a block diagram showing the architecture of a typical WLAN that supports Voice communications.

Mobile devices, such as laptops that are equipped with wireless network interface cards and personal digital assistants access the network via the APs. A typical network is shown in FIG. 1. In the figure, the access controller and/or wireless LAN switch are not shown; they are assumed to be part of the enterprise LAN infrastructure.

Each dual-mode mobile device MD has two telephone numbers: one number is assigned by the enterprise as an extension of the enterprise's PBX, and the other number is assigned by the cellular carrier. The default network for each mobile device is the enterprise (or hotspot) WLAN, which means that when a mobile device is turned on, it first searches for the enterprise's WLAN and registers with the network, if it is found. If the enterprise WLAN is not found the mobile device MD then registers with the cellular carrier network. The rationale for this operational requirement is to save the enterprise money by ensuring that mobile device users do not accrue air charges when they are within the corporate WLAN. All calls generated by the mobile device while it is on the enterprise network are routed via the corporate PBX to the public switched telephone network (PSTN).

Since each mobile device has two telephone numbers, it can be reached in two ways: via the PBX when calls come from the PSTN, and via the Cellular Proxy CP when calls come from a cellular network. Regardless of how the calls arrive, they are converted into voice over IP (VoIP) packets by the appropriate device and presented to the mobile device via the WLAN. These calls are based on the Session Initiation Protocol (SIP), which has the advantage over the ITU-T H.323 protocol in that it is a lightweight protocol that leverages the Internet protocols.

Figure 2:
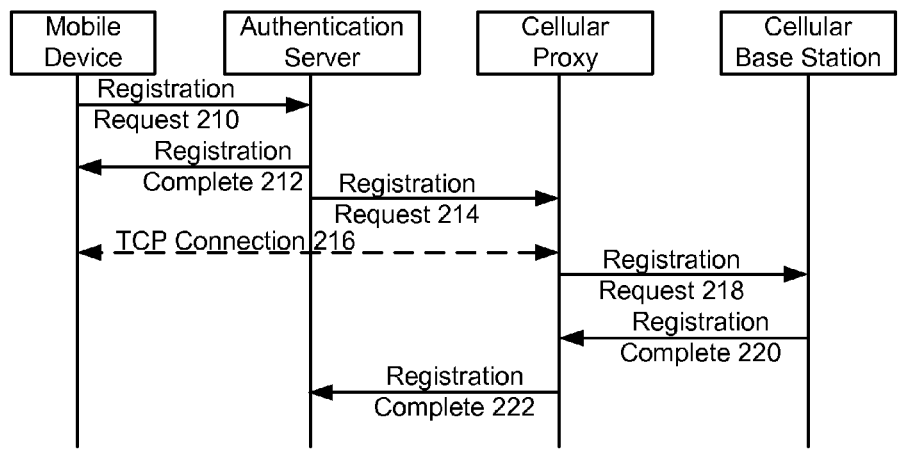
FIG. 2 is a timing diagram showing the initial mobile device registration process.

Each mobile device MD goes through an initialization process when it is turned on in the WLAN. As discussed earlier, the default network is the enterprise WLAN. Therefore, when a mobile device is turned on it sends a Registration Request message to the appropriate authentication server in the enterprise LAN. After the authority server has authenticated the mobile device, it returns a Registration Complete message to the device. The authentication server, which has information on each mobile device's cellular service provider's network, then sends a Registration Request message to the Cellular Proxy instructing the latter to register the mobile device in the device's cellular carrier network. The Cellular Proxy CP first sets up a TCP connection to the mobile device MD via the appropriate access controller (or wireless LAN switch) and access point before commencing the registration of the device in the cellular network. After the Cellular Proxy has successfully registered the mobile device in the cellular network, it returns a Registration Complete message to the authentication server. The Cellular Proxy then starts listening on the appropriate paging channel for calls destined for the mobile device from the cellular carrier network and will deliver such calls to the mobile device via the appropriate access controller (or the wireless LAN switch) and access point. The message flow for the registration process is illustrated in FIG. 2.

Consider a dual-mode mobile device that originates a call within a WLAN. As the user moves closer to the edge of the network the signal quality begins to degrade. The degradation will reach a point where the signal strength is almost imperceptible, which causes the call to be terminated.

Here, the mobile device MD has the capability to monitor the signal quality by measuring the signal-to-noise ratio (SNR). Assume also that from practical experience acquired through measurements it is known that when SNR reaches some threshold value d, the voice quality becomes unacceptable. The goal is to prevent the call quality from degrading to this critical point. Thus, when the SNR drops to a cutoff value r>d, the system initiates a handoff with the objective of completing the handoff procedure before the SNR drops down to the threshold value d. Thus the scheme operates in the following manner:

When a mobile device experiences SNR measurement value of r, it sends a Handoff Request message to the Cellular Proxy via the TCP connection that exists between the two devices.

When Cellular Proxy receives the message it takes one of two actions that depend on where the other party in the call is located.

If the other party is located in the PSTN, which means that the call passes through the PBX, then it takes the following actions: 1) the Cellular Proxy uses one of its own carrier-assigned telephone numbers to call the mobile device's carrier-assigned telephone number; 2) since the mobile device is not physically connected to the cellular network, the Cellular Proxy will also receive the call on behalf of the device; 3) after receiving the parameters of the call from the cellular network, such as the channel or code to use, power level, etc., the Cellular Proxy will forward these parameters to the mobile device over the TCP connection that it established between the two and commands the mobile device to switch its radio to the cellular network using those parameters; 4) the Cellular Proxy will then close the TCP connection, stop proxying for that device in the cellular network to avoid cloning problems, and will thereafter forward the call to the mobile device over the new connection established via the cellular network; and 5) on receiving the call parameters, the mobile device will immediately switch its radio to the cellular network without having to register again since it has already been registered and authenticated in the cellular controller by the Cellular Proxy. As it moves from base station to base station outside the enterprise network, the mobile device will be subject to the handoff mechanism that applies within the cellular network.

Figure 3:
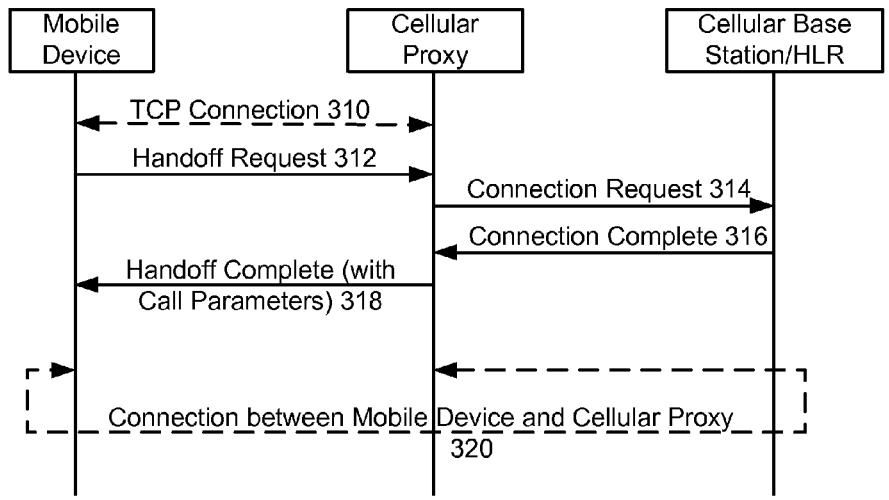
FIG. 3 is a timing diagram showing the handoff procedure for a mobile device with a PSTN-based call in progress.

This sequence of activities is illustrated in FIG. 3.

If the other party is located in the cellular carrier network, which means that the call passes through the Cellular Proxy without reaching the PBX, it takes the following set of actions: 1) since the Cellular Proxy has all the parameters of the call, it returns these parameters to the mobile device via the TCP connection between the two and commands the mobile device to switch its radio to the cellular network using those parameters; 2) the Cellular Proxy will then close the TCP connection and stop proxying for the mobile device to avoid creating cloning problems in the cellular network; 3) Upon receiving the information, the mobile device will tune its radio to the channel currently used by the Cellular Proxy and receive the call directly from the cellular network.

Figure 4:
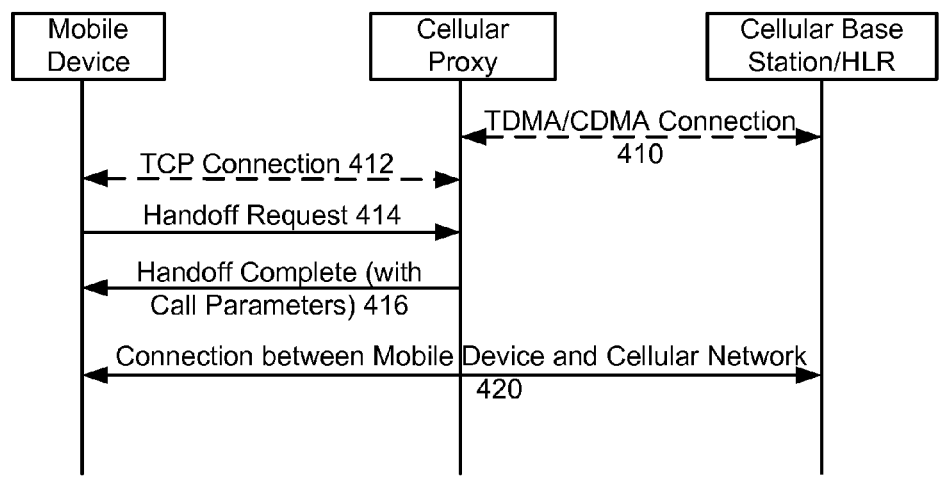
FIG. 4 is a timing diagram showing the handoff procedure for a mobile device with cellular network-based call in progress.

This sequence of activities is illustrated in FIG. 4.

Assume that the mobile device has a call in progress as it is moved from the outside world into the enterprise premises. The operational rule is that if there is good cellular coverage within the enterprise premises, the call will be allowed to complete in the cellular network after which the mobile device will register in the enterprise LAN using the procedure described earlier. However, if there is no good coverage within the enterprise premises, the device will initiate a handoff with the Cellular Proxy. The procedure is as follows:

1) if the SNR reaches the predefined cutoff value, the mobile device sends a short message service (SMS) message to the Cellular Proxy. The message contains information on the identity of the mobile device, such as its PBX extension and its cellular network telephone number as well as the parameters of the current call. The Cellular Proxy maintains a record of the cellular network that each enterprise mobile device is associated with. Therefore, with the information it received from the mobile device the Cellular Proxy sends a message to the authentication server to expedite the authentication of the mobile device.

2) The authentication server will provide emergency registration for the mobile device by broadcasting a Registration Invite message that the mobile device will respond to.

3) After locating and authenticating the mobile device, the authentication server forwards the device's location and network configuration parameters like the IP address to the Cellular Proxy.

4) After sending the emergency registration request to the authentication server, the Cellular Proxy will start monitoring the channel on which the mobile device was communicating and accumulating information destined for the device until the device has been authenticated and registered in the network 5) When the Cellular Proxy receives information on the device's location, it will set up a TCP connection to the device and forward all accumulated packets to the device.

6) After this, the operation becomes similar to that described earlier. The Cellular Proxy listens on the channel and relays information between the mobile device and the cellular network until the conversation is over and the connection is terminated. When the current call ends, the Cellular Proxy continues to listen on the cellular network's paging channel for calls destined for the mobile device, as described earlier.

Figure 5:
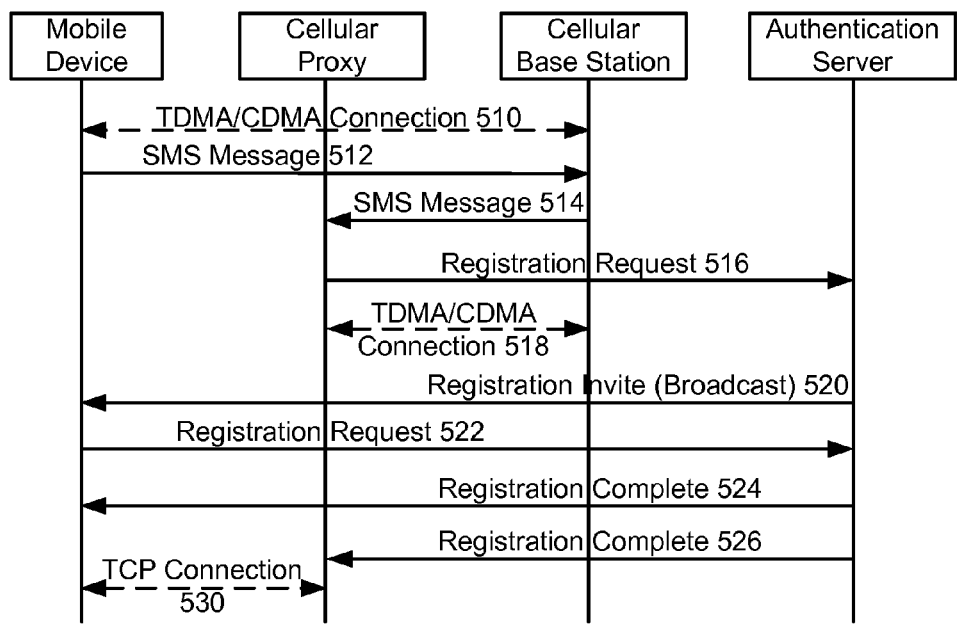
FIG. 5 is a timing diagram showing the procedure for cellular network-to-WLAN handoff.

This sequence of activities is illustrated in FIG. 5.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method, comprising: a gateway receiving a message regarding a mobile device initiating a handoff of an in-progress call, wherein the message comprises one or more parameters of the in-progress call for the handoff; the gateway sending an authentication message to authenticate the mobile device; the gateway receiving a location of the mobile device and network configuration parameters in response to the authentication message; the gateway establishing a connection with the mobile device via a wireless local area network based on the location of the mobile device; the gateway listening on a channel of a cellular carrier network used by the mobile device in the in-progress call; and the gateway relaying at least one parameter of the one or more parameters about the in progress call between the mobile device and the cellular carrier network.

2. The method of claim 1, wherein the message is a short message service (SMS) message.

3. The method of claim 1, further comprising:
after the in-progress call has terminated, the gateway listening on a paging channel of the cellular carrier network for calls destined for the mobile device.

4. The method of claim 3, further comprising:
the gateway receiving, via the paging channel, a new call destined for the mobile device; and
the gateway delivering the new call to the mobile device via the wireless local area network.

5. The method of claim 1, wherein the message further comprises information identifying the mobile device.

6. The method of claim 5, wherein the information identifying the mobile device comprises at least one telephone number associated with the mobile device.

7. The method of claim 1, wherein the one or more parameters identify the channel of the cellular carrier network used by the mobile device in the in-progress call.

8. The method of claim 1, wherein the one or more parameters identify a power level.

9. The method of claim 1, further comprising: the gateway maintaining a record of the cellular carrier network associated with the mobile device.

10. A device, comprising: a fixed radio terminal; and a gateway configured to: receive a message regarding a mobile device initiating a handoff of an in-progress call via the fixed radio terminal, wherein the message comprises one or more parameters of the in-progress call for the handoff, send an authentication message to authenticate the mobile device, receive a location of the mobile device and network configuration parameters in response to the authentication message, establish a connection with the mobile device via a wireless local area network based on the location of the mobile device, listen on a channel of a cellular carrier network used by the mobile device in the in-progress call, and relay at least one parameter of the one or more parameters about the in-progress call between the mobile device and the cellular carrier network.

11. The device of claim 10, wherein the message is a short message service (SMS) message.

12. The device of claim 10, wherein the gateway is further configured to:
after the in-progress call has terminated, listen on a paging channel of the cellular carrier network for calls destined for the mobile device.

13. The device of claim 12, wherein the gateway is further configured to:
receive, via the paging channel, a new call destined for the mobile device; and
deliver the new call to the mobile device.

14. The device of claim 10, wherein the message further comprises information identifying the mobile device.

15. The device of claim 14, wherein the information identifying the mobile device comprises at least one telephone number associated with the mobile device.

16. The device of claim 10, wherein the one or more parameters identify the channel of the cellular carrier network used by the mobile device in the in-progress call.

17. The device of claim 1, wherein the fixed radio terminal comprises one or more radios, each radio configured to communicate with one or more cellular carrier networks.

18. The device of claim 1, wherein the fixed radio terminal is configured to communicate using any of a plurality of cellular network technologies.

* * * * *

UNITED STATES PATENT AND TRADEMARK OFFICE
CERTIFICATE OF CORRECTION

PATENT NO.        : 8,041,360 B2                                            Page 1 of 1
APPLICATION NO.   : 12/874183
DATED             : October 18, 2011
INVENTOR(S)       : Ibe et al.

It is certified that error appears in the above-identified patent and that said Letters Patent is hereby corrected as shown below:

Column 5, line 27, in Claim 1, delete "in progress" and insert -- in-progress --.

Column 6, line 41, in Claim 17, delete "The device of claim 1, wherein" and insert -- The device of claim 10, wherein --.

Column 6, line 44, in Claim 18, delete "The device of claim 1, wherein" and insert -- The device of claim 10, wherein --.

Signed and Sealed this
Fifteenth Day of May, 2012

David J. Kappos
*Director of the United States Patent and Trademark Office*